(12) United States Patent
Shaikh et al.

(10) Patent No.: US 7,885,277 B2
(45) Date of Patent: Feb. 8, 2011

(54) METHODS AND APPARATUS TO ANALYZE AUTONOMOUS SYSTEM PEERING POLICIES

(75) Inventors: Aman Shaikh, Summit, NJ (US); Thomas Bradley Scholl, Seattle, WA (US); Ashley Flavel, Northgate (AU)

(73) Assignee: AT&T Intellectual Property I, L.P., Reno, NV (US)

( * ) Notice: Subject to any disclaimer, the term of this patent is extended or adjusted under 35 U.S.C. 154(b) by 30 days.

(21) Appl. No.: 12/331,148

(22) Filed: Dec. 9, 2008

(65) Prior Publication Data

US 2010/0142543 A1 Jun. 10, 2010

(51) Int. Cl.
*H04L 12/28* (2006.01)

(52) U.S. Cl. .................. 370/401; 370/238; 370/254; 709/238

(58) Field of Classification Search .................. None
See application file for complete search history.

(56) References Cited

U.S. PATENT DOCUMENTS

| | | | |
|---|---|---|---|
| 6,430,621 B1 * | 8/2002 | Srikanth et al. | 709/238 |
| 6,636,895 B1 * | 10/2003 | Li et al. | 709/238 |
| 6,697,339 B1 * | 2/2004 | Jain | 370/256 |
| 6,914,886 B2 | 7/2005 | Peles et al. | |
| 7,139,242 B2 | 11/2006 | Bays | |
| 7,150,037 B2 | 12/2006 | Wolf et al. | |
| 7,154,889 B1 | 12/2006 | Rekhter et al. | |
| 7,260,645 B2 | 8/2007 | Bays | |
| 7,376,154 B2 | 5/2008 | Ilnicki et al. | |
| 7,406,539 B2 | 7/2008 | Baldonado et al. | |
| 2004/0081154 A1 | 4/2004 | Kouvelas | |
| 2005/0047413 A1 | 3/2005 | Ilnicki et al. | |
| 2005/0071502 A1 | 3/2005 | Kamat et al. | |
| 2005/0094748 A1 * | 5/2005 | Zaboronski et al. | 375/341 |
| 2005/0201302 A1 * | 9/2005 | Gaddis et al. | 370/254 |
| 2006/0165009 A1 | 7/2006 | Nguyen et al. | |
| 2006/0233181 A1 | 10/2006 | Raszuk et al. | |
| 2007/0047464 A1 | 3/2007 | Guingo et al. | |
| 2007/0091793 A1 | 4/2007 | Filsfils et al. | |
| 2007/0250902 A1 | 10/2007 | Vaidyanathan | |
| 2008/0013551 A1 | 1/2008 | Scholl | |
| 2008/0031257 A1 * | 2/2008 | He | 370/395.31 |

(Continued)

OTHER PUBLICATIONS

Feldmann et al., "Deriving Traffic Demands for Operational IP Networks: Methodology and Experience," ACM SIGCOMM '00 Workshop on Internet Network Management, Aug. 28-Sep. 1, 2000 (14 pages).

(Continued)

*Primary Examiner*—Pankaj Kumar
*Assistant Examiner*—Ajay P Cattungal
(74) *Attorney, Agent, or Firm*—Hanley, Flight & Zimmerman, LLC

(57) ABSTRACT

Methods and apparatus to analyze autonomous system (AS) peering policies are disclosed. A disclosed example method comprises obtaining routing information from two or more border routers of a first AS, wherein the routing information identifies two or more routes to a prefix associated with a second AS, and wherein the second AS is a peer of the first AS, identifying one of the two or more routes as an inferior route advertised by the second AS based on the routing information, and determining whether a routing impact is present within the first AS due to the advertised inferior route.

26 Claims, 10 Drawing Sheets

U.S. PATENT DOCUMENTS

2008/0219272 A1* 9/2008 Novello et al. ............. 370/401
2009/0086724 A1* 4/2009 Boucadair ................. 370/352
2009/0154340 A1* 6/2009 Kumaresan et al. ......... 370/218

OTHER PUBLICATIONS

Feamster et al., "The Case for Separating Routing from Routers," ACM SIGCOMM '04 Workshop on Internet Network Management, Aug. 30-Sep. 4, 2004 (8 pages).

Flavel et al., "Neighborhood Watch: Analysis of BGP Peering Policies," Submitted to ACM SIGCOMM Workshop on Internet Network Management, Feb. 2008. Not accepted for publication or presentation prior to Dec. 12, 2008 (14 pages).

Mühlbauer et al., "Building an AS-Topology Model that Captures Route Diversity," ACM SIGCOMM '06 Workshop on Internet Network Management, Sep. 11-15, 2006 (12 pages).

Spring et al., "Quantifying the Causes of Path Inflation," ACM SIGCOMM '03 Workshop on Internet Network Management, Aug. 25-29, 2003 (12 pages).

Scholl et al., "Abstract: Peering Dragnet: Examining BGP Routes Received from Peers," North American Network Operator's Group (NANOG) 38, Oct. 8-10, 2006 (1 page).

Patrick et al., PowerPoint presentation of "Peering Dragnet: Anti-Social Behavior Amongst Peers, and What You Can Do About It," North American Network Operator's (NANOG) 38, Oct. 8-10, 2006 (30 pages).

Feamster et al., "BorderGuard: Detecting Cold Potatoes from Peers," Internet Measurement Conference (IMC), Oct. 25-27, 2004 (6 pages).

* cited by examiner

METHODS AND APPARATUS TO ANALYZE AUTONOMOUS SYSTEM PEERING POLICIES

FIELD OF THE DISCLOSURE

This disclosure relates generally to autonomous systems (ASes) in the Internet and, more particularly, to methods and apparatus to analyze AS peering policies.

BACKGROUND

The Internet is implemented as a plurality of ASes that are interconnected via a plurality of routers and communication paths. Border gateway protocol (BGP) sessions are typically used between the routers of different ASes to identify and select routes between the ASes to, for example, transport user data received at a first AS to a destination associated with a second AS. Implementation of a peering relationship between two ASes within the Internet is based on a trust that each AS will adhere to the terms of an established peering agreement. An example peering agreement specifies that each peer is to announce equally good, that is, canonical BGP routes at each peering location when two peers interconnect at multiple places. However, not all ASes adhere to such agreed upon peering policies.

DETAILED DESCRIPTION

Example methods and apparatus to analyze autonomous system (AS) peering policies are disclosed. A disclosed example method includes obtaining routing information from two or more border routers of a first AS, wherein the routing information identifies two or more routes to a prefix associated with a second AS, and wherein the second AS is a peer of the first AS, identifying one of the two or more routes as an inferior route advertised by the second AS based on the routing information, and determining whether a routing impact is present within the first AS due to the advertised inferior route.

A disclosed example apparatus includes a data collector to obtain border gateway protocol (BGP) routing information from two or more border routers of a first AS, wherein the BGP routing information identifies two or more routes to a prefix associated with a second AS, and wherein the second AS is a peer of the first AS, a route classifier to identify one of the two or more routes as an inferior route advertised by the second AS based on the BGP routing information, and a route analyzer to determine whether a routing impact is present within the first AS due to the inferior route.

In the interest of brevity and clarity, throughout the following disclosure references will be made to an example communication system 100 of FIG. 1. However, the methods and apparatus described herein to analyze AS peering polices, and/or to mitigate non-canonical AS peering policies are applicable to other types of networks constructed using other network technologies, topologies and/or protocols.

Figure 1:
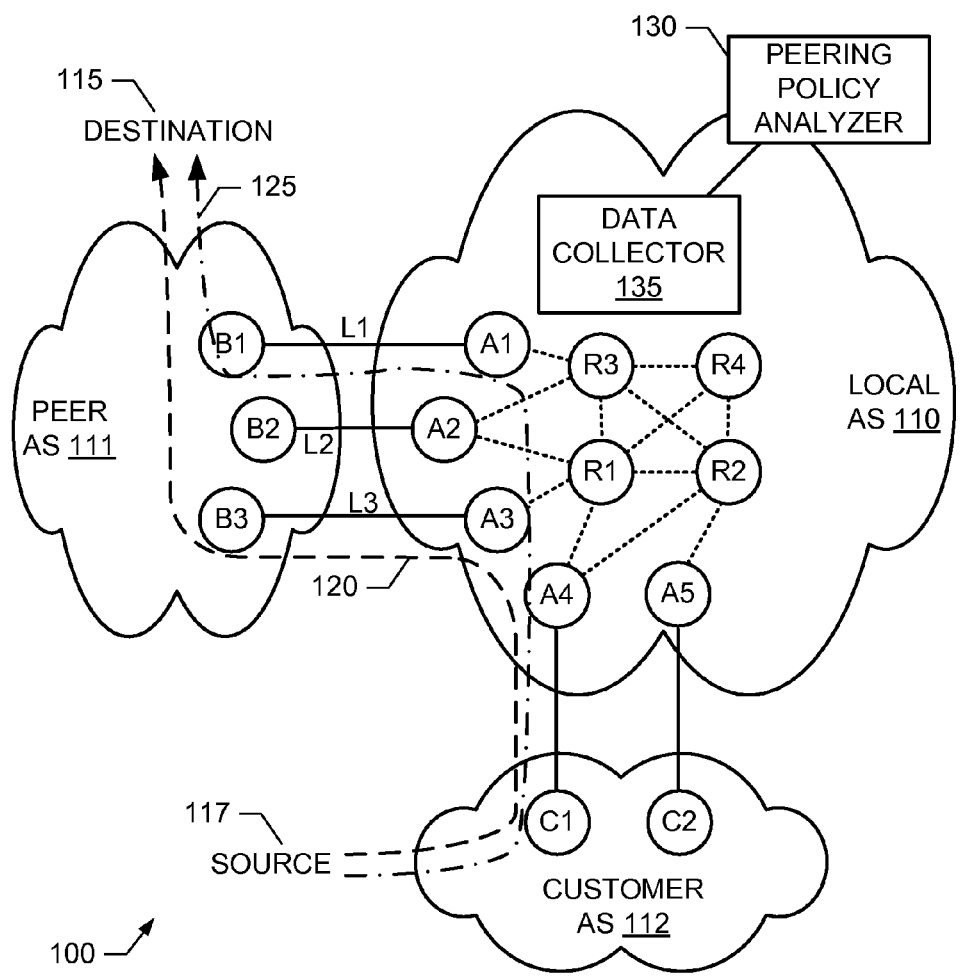
FIG. 1 is a schematic illustration of example communication system constructed in accordance with the teachings of this disclosure.

FIG. 1 illustrates the example communication system 100. The example communication system 100 of FIG. 1 includes a plurality of individual autonomous systems (ASes), three of which are designated are reference numerals 110, 111 and 112. The example ASes 110-112 of FIG. 1 are interconnected via any number and/or type(s) of border routers. In the illustrated example of FIG. 1, the ASes 110 and 111 are communicatively coupled via three pairs of border routers {A1, B1}, {A2, B2} and {A3, B3}, and the ASes 110 and 112 are communicatively coupled via two pairs of border routers {A4, C1} and {A5, C2}. Each of the pairs of border routers collectively implements a respective AS-to-AS link. For example, the pair of border routers {A1, B1} implements a link L1 between the ASes 110 and 111. Routing information may be exchanged and/or be announced by the example ASes 110-112 over the AS-to-AS links (for example, the links L1, L2, etc.) in accordance with any past, present and/or future external BGP standard, recommendation and/or specification. External BGP is often referred to in the industry as "BGP," or "eBGP." While the examples described herein are implemented in accordance with one or more BGP standards, recommendations and/or specifications, any number and/or type(s) of alternative and/or additional routing protocols, standards, recommendations and/or specifications may be used.

Routes learned from neighboring ASes 110-112 are distributed within the example ASes 110-112 in accordance with any past, present and/or future interior BGP (iBGP) standard, recommendation and/or specification. Small ASes 110-112 generally implement a full-mesh of iBGP sessions between the routers of their respective AS 110-112. Each route received at a particular router of a specific AS 110-112 is propagated to every other router of that AS 110-112. However, a full-mesh of iBGP sessions may not be practical as the number of routers in an AS 110-112 becomes large. To improve scalability, the example AS 110 of FIG. 1 implements a hierarchy of route reflectors, four of which are designated at reference numerals R1-R4. The example route reflectors R1-R4 of FIG. 1 re-announce some of the routes received at a particular router A1-A5 to selected, configured and/or provisioned others of the routers A1-A5 over iBGP sessions. While, the implementation of an iBGP hierarchy may limit the number of candidate routes that is learned at each router A1-A5, such restrictions improve the scalability of the AS 110.

Relationships between ASes generally fall into one of two broad categories: peer-peer and customer-provider. In the illustrated example of FIG. 1, the AS 112 is a "customer AS" of the example AS 110, which is a "provider AS" for the AS 112. The example customer AS 112 of FIG. 1 financially compensates the provider AS 110 for providing connectivity for customers of the AS 112 to other portions of the Internet that are not directly accessible via the AS 112. The example AS 111 of FIG. 1 is a "peer AS" of, is a "peered AS" of and/or is "peered" to the example AS 110. The example peer ASes 110 and 111 have a mutually beneficial relationship to provide connectivity for each other's customers and/or provide connectivity to other portions of the Internet that are not directly accessible via their respective AS 110, 111. Peer ASes generally do not remunerate each other for traffic transported between the peer ASes. In general, an AS 110-112 may simultaneously operate in different roles with any number and/or type(s) of other ASes 110-112. For instance, the example AS 110 simultaneously operates as both a provider AS to the customer AS 112 and as a peer AS to peer AS 111.

As shown in FIG. 1, ASes 110-112 are often communicatively coupled to each other at geographically separate locations, regardless of whether the AS relationship is peer-peer or customer-provider. For example, the ASes 110 and 111 are coupled via a link L1 at a first geographic location, via a link L2 at a second geographic location, and via a link L3 at a third geographic location. When two ASes 110-112 are communicatively coupled at different locations, each AS 110-112 is typically required to send and/or announce equally attractive routes to each destination prefix (one of which is designated at reference numeral 115) on each of the peering links (for example, the links L1-L3) that communicatively couple the ASes 110-112. Equally attractive routes are characterized as having equally good attributes, such as ASPath length, Origin type and/or multi-exit discriminator (MED) value. As used herein, such a policy is referred to as a "canonical routing policy." Use of a canonical routing policy by the example peer AS 111 allows the example AS 110 to minimize resource usage by choosing egress links to the AS 111 that are closest to ingress points via which traffic is received at the AS 110. For example, when data that is transmitted by a source 117 and destined for the destination prefix 115 of the example AS 111 is received at the router A4 of the example AS 110, the example AS 110 can preferably route the data to the peer AS 111 via the router A3, as shown by line 120. However, were the peer AS 111 to instead use and/or implement a non-canonical routing policy, the AS 110 may end up routing the received data to the peer AS 111 via the router A1 instead of the router A3, as shown by line 125. Such a route 125 through the AS 110 may be selected by the AS 110 if the peer AS 111 announced a more attractive route to the destination prefix 115 on link L1 than on the links L2 and L3. Moreover, the route 125 may be selected by the AS 110 even though the length of the route 125 through the AS 110 is longer than the length of route 120 through the AS 110. Further still, assuming that the AS 110 implements a canonical routing policy even though the AS 111 does not, the AS 111 is free to choose the link L1 for traffic to be transported from the destination prefix 115 to the source 117. As such, the example AS 110 may transport data across its backbone in both directions between the source 117 and the destination prefix 115. Such conditions clearly violate the conventional goal of a mutually beneficial, no-cost peering relationship. As described above, a mutually beneficial peering relationship relies on the symmetrical usage of canonical routing policies. While in some examples non-canonical policies may be pre-negotiated and/or pre-agreed upon between two peer ASes 110 and 111, non-canonical policy may represent a deliberate breach of a peering agreement to, for example, satisfy local objectives, represent an unintentional border router configuration error, and/or result from the destination prefix 115 configuring a non-export attribute.

To identify and/or detect non-canonical routing policies, the example AS 110 includes a peering policy analyzer 130. Based on routing information obtained from the example routers A1-A5, the example peering policy analyzer 130 determines whether equally attractive routes to destinations 115 are being advertised by the AS 111 on each of the links L1-L3. When equally attractive routes are not being advertised by the AS 111 on each of the links L1-L3, the example peering policy analyzer 130 determines whether the non-canonical routing policy implemented by the peer AS 111 affects, in practice, routing decisions made by the routers A1-A5 of the example AS 110. If routing decisions within the AS 110 are affected by the non-canonical routing policy of the AS 111, the example peering policy analyzer 130 determines the traffic impact of the non-canonical routing policy. An example traffic impact includes a byte-mile metric that represents the additional geographic miles that bytes transit through the AS 110 due to the non-canonical routing policy of the AS 111. An example manner of implementing the example peering policy analyzer 130 of FIG. 1 is described below in connection with FIG. 3. Example processes that may be carried out to implement the example peering policy analyzer 130 are described below in connection with FIGS. 4-10.

Figure 11:
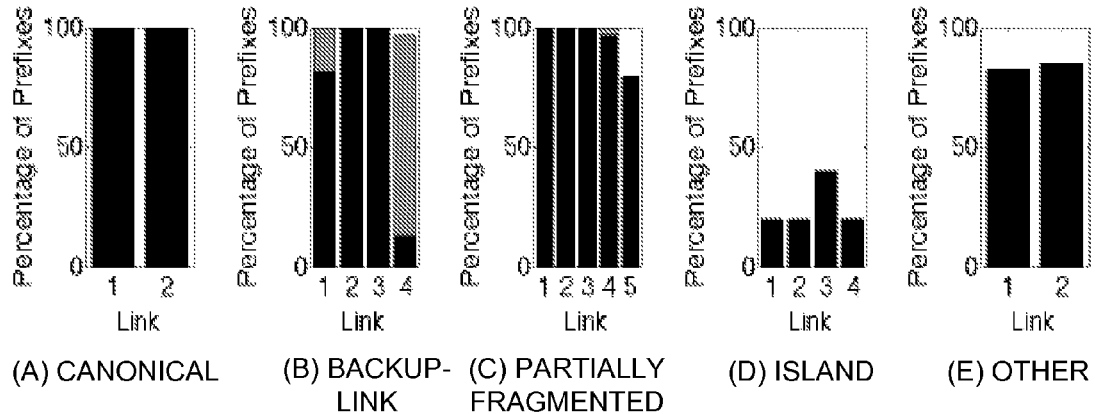
FIGS. 11A-E illustrates example classifications of peering policies.

For each peer AS 111 analyzed by the example peering policy analyzer 130 of FIG. 1, the example peering policy analyzer 130 classifies the AS 111, and/or generates one or more sets of data, graphs and/or reports that characterize and/or represent the routing policies of the AS 111. Example outputs that may be generated by the example peering policy analyzer 130 are described below in connection with FIGS. 11-13.

To obtain route information from the example routers A1-A5 of the example AS 110, the example AS 110 of FIG. 1 includes a data collector 135. Using any number and/or type (s) of method(s), protocol(s) and/or interface(s), the example data collector 135 of FIG. 1 collects information concerning routes received at the border routers A1-A5. Preferably, any route received at any of the routers A1-A5 could be recorded and/or obtained by the example data collector 135. However, many commercial routers do not implement such capabilities. The example data collector 135 of FIG. 1 periodically or aperiodically grabs a "snapshot" of the routing information base (RIB) for incoming routes (RIB-in) contents and the post-policy RIB (RIB-pp) contents from each of the border routers A1-A5. Such snapshots may be obtained by, for example, executing a "show ip bgp" command on each of the routers A1-A5.

Because the snapshots may not be taken simultaneously at each of the border routers A1-A5, the example data collector 135 of FIG. 1 may process the data so that BGP dynamics are not incorrectly construed as a non-canonical policy by the example peering policy analyzer 130. For example, the example data collector 135 may identify which destination prefixes 115 are stable such that only stable prefixes 115 are processed by the example peering policy analyzer 130. Stable prefixes may be, for example, distinguished from unstable prefixes by tracking changes to the routes selected by the routers A1-A5 and/or the route reflectors R1-R4. To do so, the example data collector 135 establishes iBGP sessions with routers A1-A5 and/or route reflectors R1-R4 of interest. Over each iBGP sessions, the data collector 135 receives BGP updates, like any other router A1-A5, and records them. Because no export policy is configured for the iBGP sessions between the data collector 135 and the selected routers A1-A5, the BGP updates received at the data collector 135 reflect the contents of and/or changes to the local RIB (Loc-RIB) of the selected routers A1-A5.

While an example communication system 100 has been illustrated in FIG. 1, one or more of the interfaces, data structures, elements, processes and/or devices illustrated in FIG. 1 may be combined, divided, re-arranged, omitted, eliminated and/or implemented in any other way. Further, the example routers A1-A5, B1-B3, C1 and C2, the example route reflectors R1-R4, the example data collector 135 and/or the example peering policy analyzer 130 of FIG. 1 may be implemented by hardware, software, firmware and/or any combination of hardware, software and/or firmware. Thus, for example, any of the example routers A1-A5, B1-B3, C1 and C2, the example route reflectors R1-R4, the example data collector 135 and/or the example peering policy analyzer 130 may be implemented by one or more circuit(s), programmable processor(s), application specific integrated circuit(s) (ASIC(s)), programmable logic device(s) (PLD(s)) and/or field programmable logic device(s) (FPLD(s)), etc. Further still, a communication system may include interfaces, data structures, elements, processes and/or devices instead of, or in addition to, those illustrated in FIG. 1 and/or may include more than one of any or all of the illustrated interfaces, data structures, elements, processes and/or devices.

Figure 2:
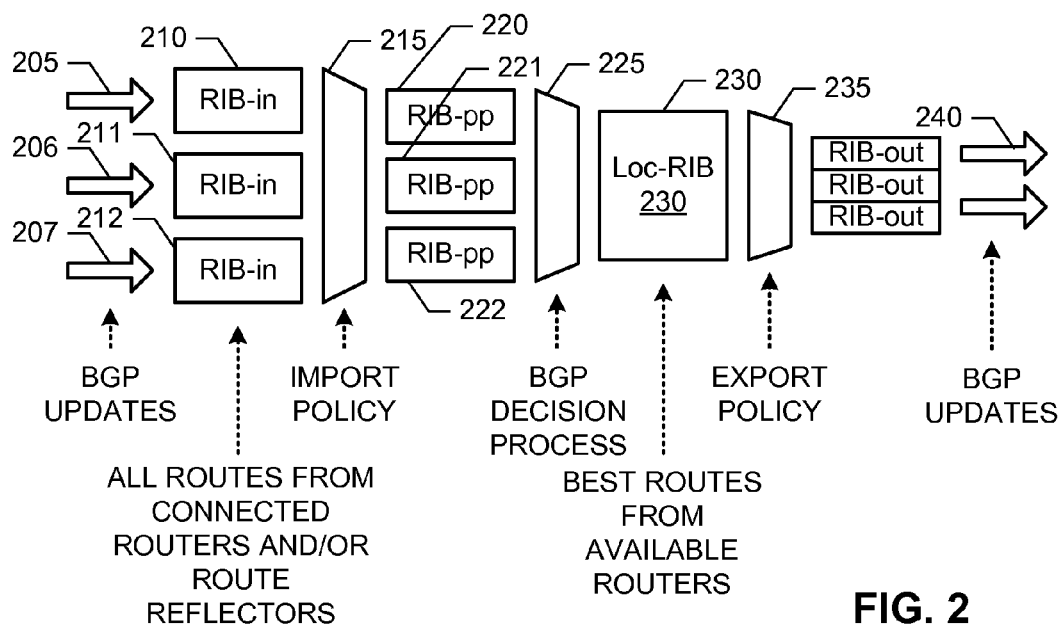
FIG. 2 illustrates an example manner of implementing a routing data structure for a router of the example communication system of FIG. 1.

FIG. 2 illustrates an example manner of implementing a BGP routing data structure 200 for any of the example routers A1-A5 of FIG. 1. Each BGP update 205-207 that is received is recorded in a RIB-in, three of which are designated at reference numerals 210-212. In the illustrated example of FIG. 2, a RIB-in 210-212 is implemented for each router A1-A5 from which BGP updates 205-207 are received.

Based on a configured and/or provisioned BGP import policy 215, routes stored in each of example RIB-ins 210-212 are filtered (for example, some are discarded) and/or have one or more attributes modified. The filtered and/or modified routes are stored in RIB-pps 220-222. In the illustrated example of FIG. 2, a RIB-pp 220-222 is implemented for each of the RIB-ins 210-212.

A BGP decision process or logic 225 is applied to the RIB-pps 220-222 to select the best route to each destination prefix 115. The best route for each prefix 115 is stored in a Loc-RIB 230. As illustrated in FIG. 2, an export policy 235 is applied to the Loc-RIB 230 to determine and/or select which routes of the Loc-RIB 230 are forwarded as BGP updates (one of which is designated at reference numeral 240) to neighboring routers A1-A5, route reflectors R1-R5 and/or the example data collector 135 of FIG. 1.

Figure 3:
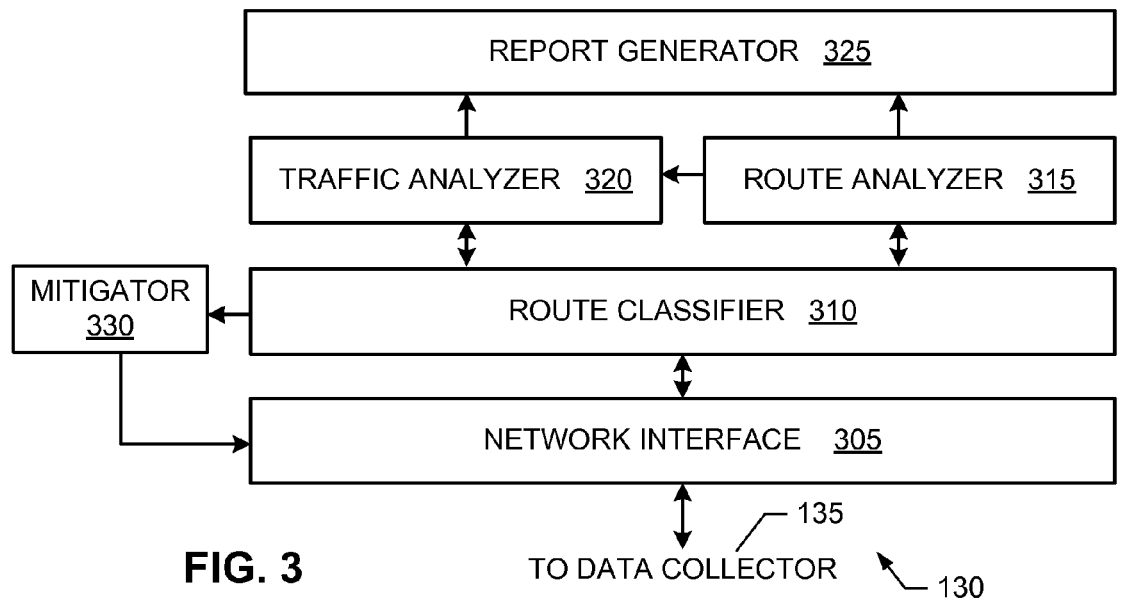
FIG. 3 illustrates an example manner of implementing a peering policy analyzer for the example communication system of FIG. 1.

FIG. 3 illustrates an example manner of implementing the example peering policy analyzer 130 of FIG. 1. To implement an interface to, for example, the example data collector 135 of FIG. 1, the example peering policy analyzer 130 of FIG. 3 includes any type of network interface 305. The example network interface 305 of FIG. 3 is implemented in accordance with any past, present and/or future standard, recommendation and/or specification for Ethernet transceivers. However, the network interface 305 may be implemented in accordance with any other past, present and/or future standard, recommendation and/or specification relating to network interfaces and/or network technologies.

To classify the routes advertised by the example peer AS 111, the example peering policy analyzer 130 of FIG. 3 includes a route classifier 310. The example router classifier 310 of FIG. 3 obtains route information for each of the border routers A1-A3 from the example data collector 135 of FIG. 1 via the example network interface 305. Based on the obtained route information, the example route classifier 310 classifies the routes to each prefixed advertised by the peer AS 111 at each of the border routers A1-A3. An example process that may be carried out to classify routes is described below in connection with FIG. 5.

Based on the route classifications, the example route classifier 310 of FIG. 3 classifies the peer AS 111 into one of the example classifications shown in FIGS. 11A-E. For example, a canonical peer shown in FIG. 11A has the best route to each prefix advertised on each link. Another peer typified by FIG. 11B has most of the best routes advertised on a majority of the links, with another link reserved for backup purposes. Yet another peer illustrated in FIG. 11C is partially fragmented with a majority of the links having the best routes advertised on them. An island peer illustrated in FIG. 11D has the best routes divided among the links. Finally, FIG. 11E shows a peer that does not fall clearly into any of the example classifications shown in FIGS. 11A-D. While example peer classifications are shown in FIGS. 11A-11E, any number and/or type(s) of additional and/or alternative peer classifications may be used.

Returning to FIG. 3, to analyze the effect of non-canonical routing policies, the example peering policy analyzer 130 of FIG. 3 includes a route analyzer 315 and a traffic analyzer 320. For each inferior route advertised at a particular router A1-A5, the example route analyzer 315 of FIG. 3 determines whether an advertised inferior route impacted route selection (s) within the example AS 110 as compared to routing within the example AS 110 were a canonical routing policy assumed. Example processes that may be carried out to implement the example route analyzer 315 are described below in connection with FIGS. 6-8.

Figure 12:
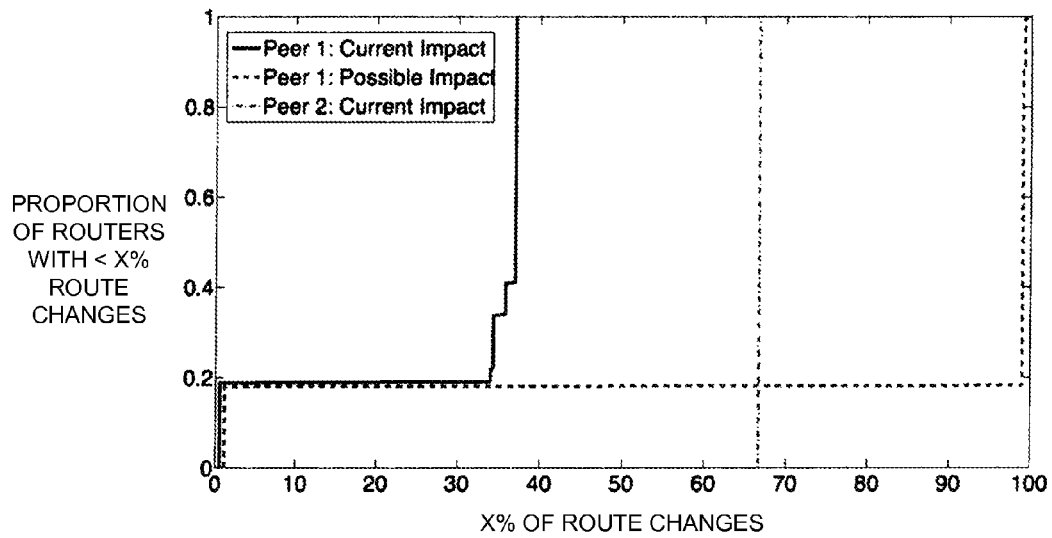
FIG. 12 is a graph showing example routing impacts that may result from non-canonical peering policies.

An example graph that may be used to represent the resultant and/or overall effects of the routing selection impact(s) identified by the example route analyzer 315 is shown in FIG. 12. The graph of FIG. 12 illustrates example percentages of route changes as cumulative distribution functions (CDFs). As shown in FIG. 12, a peer's routing policy can have different impacts for different routers. For example, approximately 19% of the border routers of a particular AS are completely unaffected by Peer 1's non-canonical routing policy. However, the remaining 81% of routers have 35% to 38% of their route selections affected. Also shown in FIG. 12 is a CDF for a second peer. For Peer 2, which is an island peer (see FIG. 11D), all border routers have approximately 66% of their route selections affected by Peer 2's non-canonical routing policy. While an example CDF graph is illustrated in FIG. 12, any other number and/or type(s) graphs and/or lists may be used, additionally and/or alternatively, to represent the routing impact(s) caused by a peer's non-canonical routing policy.

When the example route analyzer 315 determines that a non-canonical routing policy affected route selection(s) within the example AS 110, the example traffic analyzer 320 of FIG. 3 estimates and/or computes the additional distance (s) that various data flows experience within example AS 110 as a result of the non-canonical routing policy as compared to traffic flow lengths within the example AS 110 were a canonical routing policy assumed. Example processes that may be carried out to implement the example traffic analyzer 320 of FIG. 3 are described below in connection with FIGS. 6 and 9.

Figure 13:
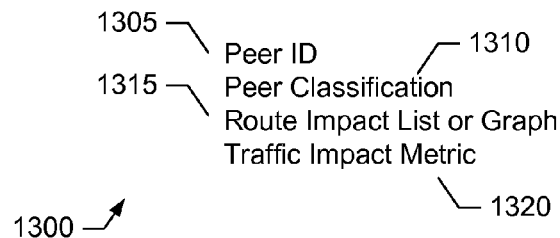
FIG. 13 illustrates an example AS peering policy impact report.

To generate reports on the routing policies of the peer AS 111, the example peering policy analyzer 130 of FIG. 3 includes a report generator 325. Based on route classifications determined by the example router classifier 310, route impacts identified by the example route analyzer 315 and/or traffic impacts identified by the example traffic analyzer 320, the example report generator 325 of FIG. 3 generates a peer routing policy report. An example AS peering policy analysis report 1300 is shown in FIG. 13. The example AS peering policy analysis report 1300 of FIG. 13 may be stored in a volatile and/or non-volatile memory for subsequent recall, be printed and/or otherwise displayed on, for example, a computer screen.

To identify the analyzed peer AS 111, the example AS peering policy analysis report 1300 of FIG. 13 includes an ID field 1305. The example ID field 1305 of FIG. 1305 contains one or more alphanumeric characters that uniquely represent the AS 111.

To store the classification of the analyzed peer 1305, the example AS peering policy analysis report 1300 of FIG. 13 includes a peer classification field 1310. The example peer classification field 1310 contains one or more alphanumeric characters that represent, for example, one of the example peer classification types of FIGS. 11A-D.

To provide route selection impact information, the example AS peering policy analysis report 1300 of FIG. 13 includes a route impact portion 1315. The example route impact portion 1315 of FIG. 13 includes one or more of a list of prefixes that were advertised by the example peer AS 111 with unequal routes, and/or a graph such as the example graph of FIG. 12 that represents the overall route selection impacts due to the peer's non-canonical routing policy.

To provide a traffic impact, the example AS peering policy analysis report 1300 of FIG. 13 includes a traffic impact metric field 1320. The example traffic impact metric field 1320 provides one or more values that, for example, represent the additional distance(s) that data associated with the peer AS 111 traveled through the AS 110 due to AS 111's non-canonical routing policy.

While an example AS peering policy analysis report 1300 is illustrated in FIG. 13, the example AS peering policy analysis report 1300 may be implemented using any number and/or type(s) of other and/or additional entries, fields and/or data. Further, the entries, fields and/or data illustrated in FIG. 13 may be combined, divided, re-arranged, eliminated and/or implemented in any way. Further still, a AS peering policy analysis report may include entries, fields and/or data in addition to, or instead of, those illustrated in FIG. 13, and/or may include more than one of any or all of the illustrated entries, fields and/or data.

Returning to FIG. 3, to mitigate the effect of the peer AS 110's non-canonical peering policy, the example peering policy analyzer 130 of FIG. 3 includes a mitigator 330. Based on the route classifications identified by the example route classifier 310, the example mitigator 330 of FIG. 13 modifies one or more parameters and/or properties of the example route reflectors R1-R4 and/or the import policies 215 of the border routers A1-A3 via, for example, the example network interface 305 to mitigate the effects of non-equal route advertisements made by the peer AS 111. An example process that may be carried out to mitigate the effect(s) of non-canonical routing policies is described below in connection with FIG. 10.

While an example manner of implementing the example peering policy analyzer 130 of FIG. 1 has been illustrated in FIG. 3, one or more of the interfaces, data structures, elements, processes and/or devices illustrated in FIG. 3 may be combined, divided, re-arranged, omitted, eliminated and/or implemented in any other way. Further, the example network interface 305, the example route classifier 310, the example route analyzer 315, the example traffic analyzer 320, the example report generator 325, the example mitigator 330 and/or, more generally, the example peering policy analyzer 130 of FIG. 3 may be implemented by hardware, software, firmware and/or any combination of hardware, software and/or firmware. Thus, for example, any of the example network interface 305, the example route classifier 310, the example route analyzer 315, the example traffic analyzer 320, the example report generator 325, the example mitigator 330 and/or, more generally, the example peering policy analyzer 130 may be implemented by one or more circuit(s), programmable processor(s), ASIC(s), PLD(s) and/or FPLD(s), etc. Further still, a peering policy analyzer may include interfaces, data structures, elements, processes and/or devices instead of, or in addition to, those illustrated in FIG. 3 and/or may include more than one of any or all of the illustrated interfaces, data structures, elements, processes and/or devices.

Figure 4:
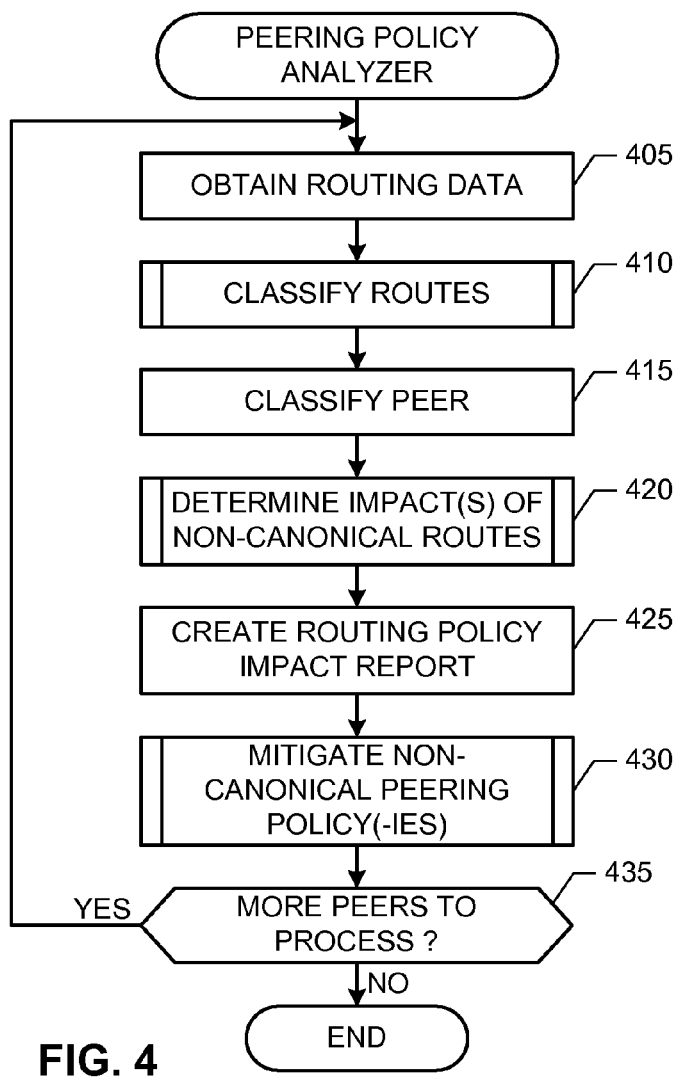
FIGS. 4-10 are flowcharts representative of example processes that may be carried out to implement the example peering policy analyzers of FIGS. 1 and 3.
Figure 5:
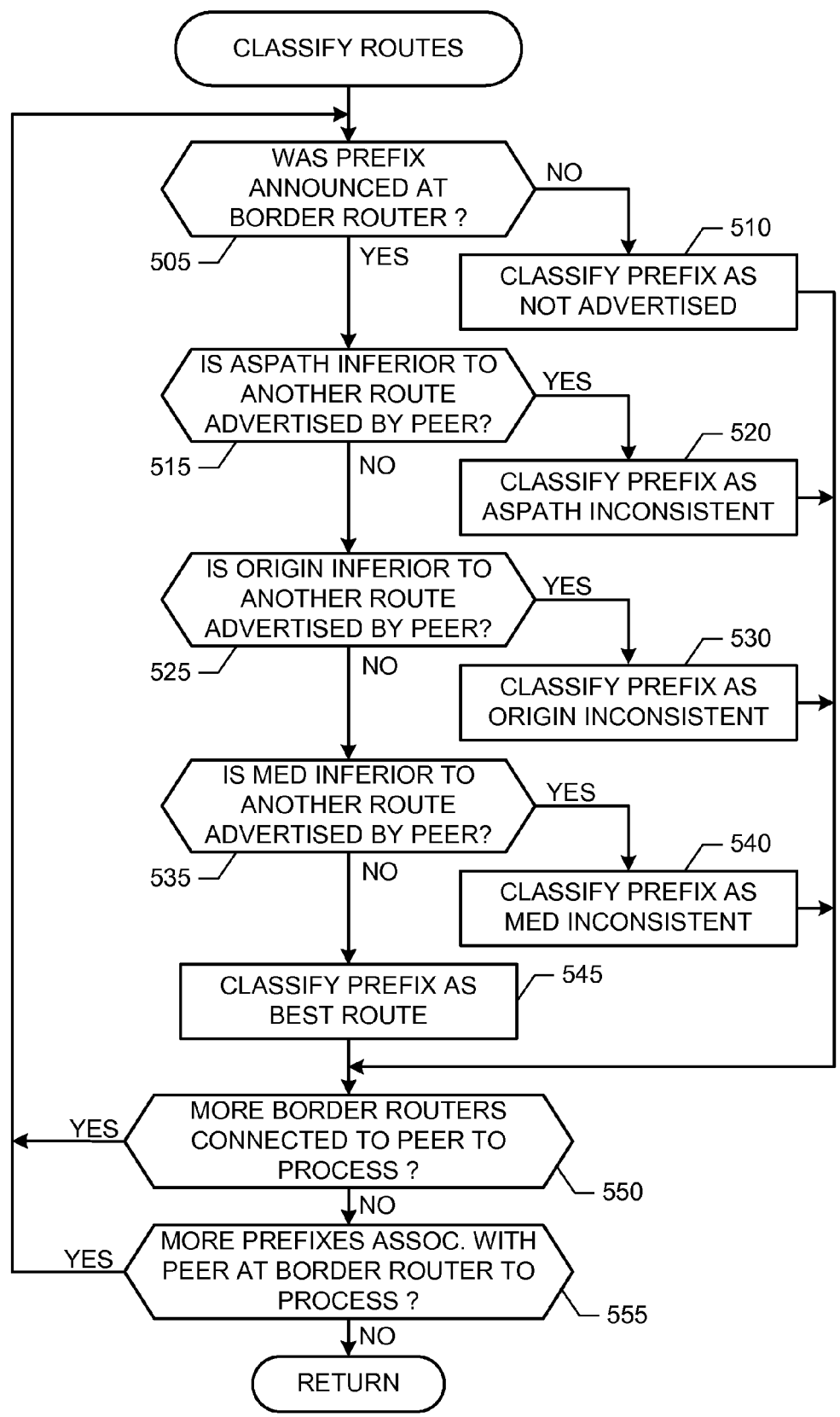

FIG. 4 is a flowchart representative of an example process that may be carried out to implement the example peering policy analyzer 130 of FIGS. 1 and 3. FIG. 5 is a flowchart representative of an example process that may be carried out to implement the example route classifier 310 of FIG. 3. FIGS. 6-9 are flowcharts representative of example processes that may be carried out to implement the example route analyzer 315 and the example traffic analyzer 320. FIG. 10 is a flowchart representative of an example process that may be carried out to implement the example mitigator 330.

The example processes of FIGS. 4-10 may be carried out by a processor, a controller and/or any other suitable processing device. For example, the example processes of FIGS. 4-10 may be embodied in coded instructions stored on any tangible computer-readable medium such as a flash memory, a compact disc (CD), a digital versatile disc (DVD), a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible and/or machine-readable instructions or data structures, and which can be accessed by a processor, a general-purpose or special-purpose computer, or other machine with a processor (e.g., the example processor platform P100 discussed below in connection with FIG. 14). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example processes of FIGS. 4-10 may be implemented using any combination(s) of ASIC(s), PLD(s), FPLD(s), discrete logic, hardware, firmware, etc. Also, some or all of the example processes of FIGS. 4-10 may instead be implemented manually or as any combination of any of the foregoing techniques, for example, any combination of firmware, software, discrete logic and/or hardware. Further, many other methods of implementing the example operations of FIGS. 4-10 may be employed. For example, the order of execution of the blocks may be changed, and/or one or more of the blocks described may be changed, eliminated, subdivided, or combined. Additionally, any or all of the example processes of FIGS. 4-10 may be carried out sequentially and/or carried out in parallel by, for example, separate processing threads, processors, devices, discrete logic, circuits, etc.

The example process of FIG. 4 begins with the example data collector 135 of FIG. 1 obtaining route advertisements received from a peer AS that is to be analyzed (for example, the AS 111) (block 405). The example route classifier 310 of FIG. 3 analyzes the routes advertised by the presently considered peer AS by, for example, carrying out the example process of FIG. 5 (block 410). The route classifier 310 classifies the peer AS according to, for example, one of the example classifications of FIGS. 11A-D (block 415).

The example route analyzer 315 and the example traffic analyzer 320 of FIG. 3 analyze, estimate, compute and/or otherwise determine the impact(s) of non-canonical routes, if any, advertised by the presently considered peer AS by, for example, carrying out the example processes of FIGS. 6-9 (block 420). Based on the analyses performed at block 420, the example report generator 325 creates a peering policy analysis report, such as the example report 1300 of FIG. 13 (block 425).

The example mitigator 330 mitigates the effects, if any, of the presently considered peer AS's non-canonical peering policy by, for example, carrying out the example process of FIG. 10 (block 430). If there are more peer ASes to analyze (block 435), control returns to block 405 to analyze the next peer AS. If there are no more peer ASes to analyze (block 435), control exits from the example process of FIG. 4.

The example process of FIG. 5 may be carried out to analyze, for the presently considered peer AS, the route(s) advertised at each of the routers A1-A5 for each prefix. Starting with a first prefix and a first border router associated with the presently considered peer AS, the example process of FIG. 5 begins with the example route classifier 310 of FIG. 3 determining whether a route for the presently considered prefix was announced at the presently considered border router (block 505). If the prefix was not announced at the border router (block 505), the prefix is classified as "not advertised" at this router (block 510). Control then proceeds to block 550, to determine if more border routers need to be processed for the presently considered prefix.

If more border routers are to be processed (block 550), control returns to block 505 to process the presently considered prefix at another border router. If no more border routers need to be processed (block 550), the router classifier 310 determines whether there are additional prefixes announced by the presently considered peer AS to be processed (block 555). If there are more prefixes to process (block 555), control returns to block 505 to process the next prefix. If there are no more prefixes to process (block 555), control exits from the example process of FIG. 5 to the example process of FIG. 4 at block 415.

Returning to block 505, if the prefix was announced at this router (block 505) and the ASPath value contained in the advertised route is inferior to the ASPath value advertised for the prefix at a different border router (block 515), the router classifier 310 classifies the prefix as "ASPath inconsistent" at the presently considered router (block 520). Control then proceeds to block 550.

Returning to block 515, if the ASPath value is not inferior (block 515) and the Origin value contained in the advertised route is inferior to the Origin value advertised for the prefix at a different border router (block 525), the router classifier 310 classifies the prefix as "Origin inconsistent" at the presently considered router (block 530). Control then proceeds to block 550.

Returning to block 525, if the Origin value is not inferior (block 525) and the MED value contained in the advertised route is inferior to the MED value advertised for the prefix at a different border router (block 535), the router classifier 310 classifies the prefix as "MED inconsistent" at the presently considered router (block 540). Control then proceeds to block 550.

Returning to block 535, if the MED value is not inferior (block 535), the router classifier 310 classifies the prefix as "Best Route" at the presently considered router (block 545). Control then proceeds to block 550.

Figure 6:
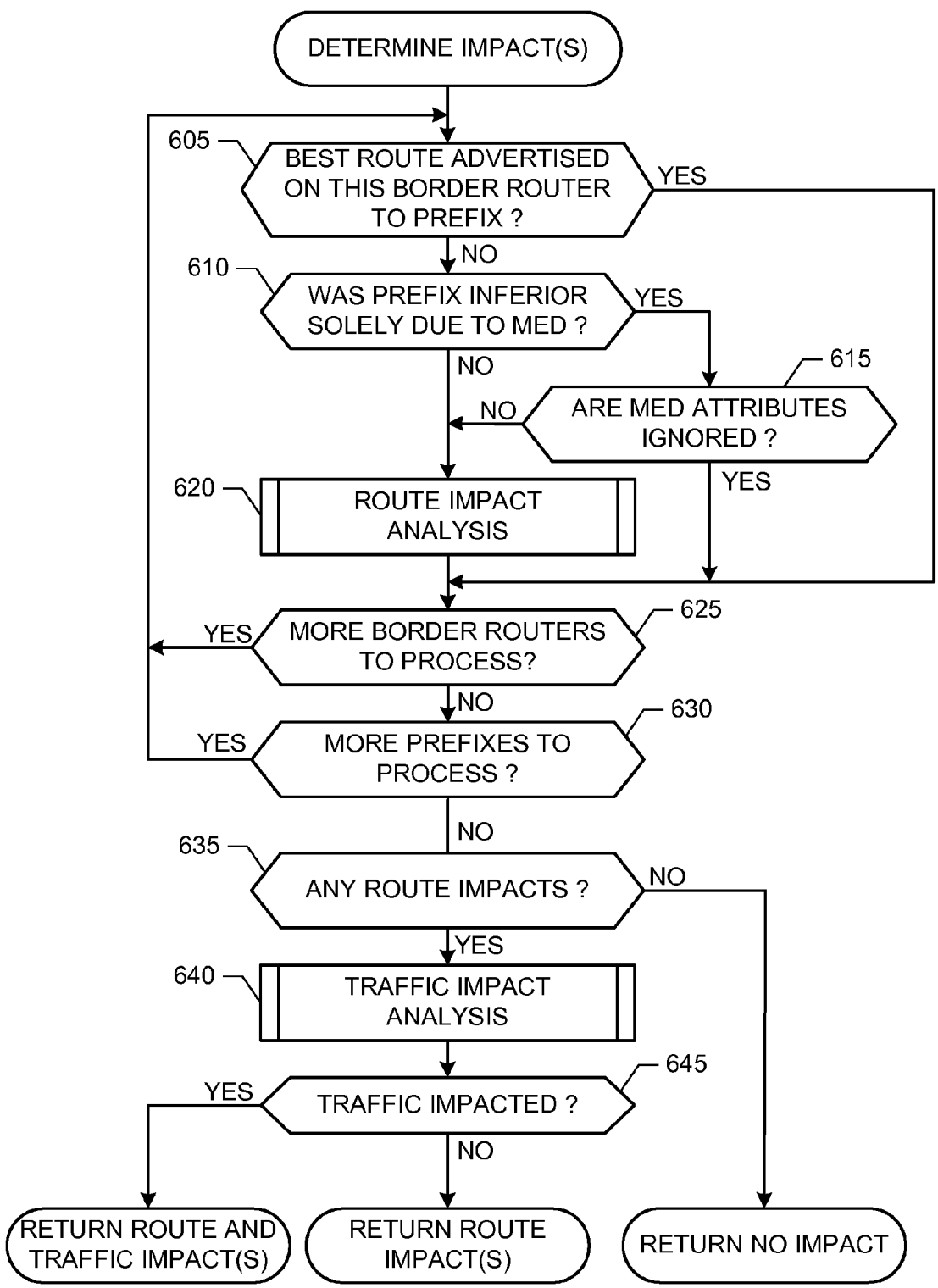

The example process of FIG. 6 may be carried out to compute, identify, estimate and/or otherwise determine the impact(s) of a non-canonical peering policy of the presently considered peer AS. Starting with a first prefix and a first border router associated with the presently considered peer AS, the example process of FIG. 6 begins with the example route analyzer 315 of FIG. 3 determining whether the route for the presently considered prefix was classified as "best route" (block 605). If the prefix was classified as "best route" at the border router (block 605), control proceeds to block 625, to determine if more border routers need to be processed for the presently considered prefix.

If more border routers are to be processed (block 625), control returns to block 605 to process the presently considered prefix at another border router. If no more border routers need to be processed (block 625), the router analyzer 315 determines whether there are additional prefixes announced by the presently considered peer AS to be processed (block 630). If there are more prefixes to process (block 630), control returns to block 605 to process the next prefix. If there are no more prefixes to process (block 630), control proceeds to block 635, which is described below.

Returning to block 605, if the route for the presently considered prefix was not classified as "best route" for the presently considered border router (block 605), the route analyzer 315 determines whether the route is classified as "MED inferior" (block 610). If the route was classified as "MED inferior" (block 610) and the AS 110 ignores MED attributes of advertised routes (block 615), control proceeds to block 625.

Figure 7:
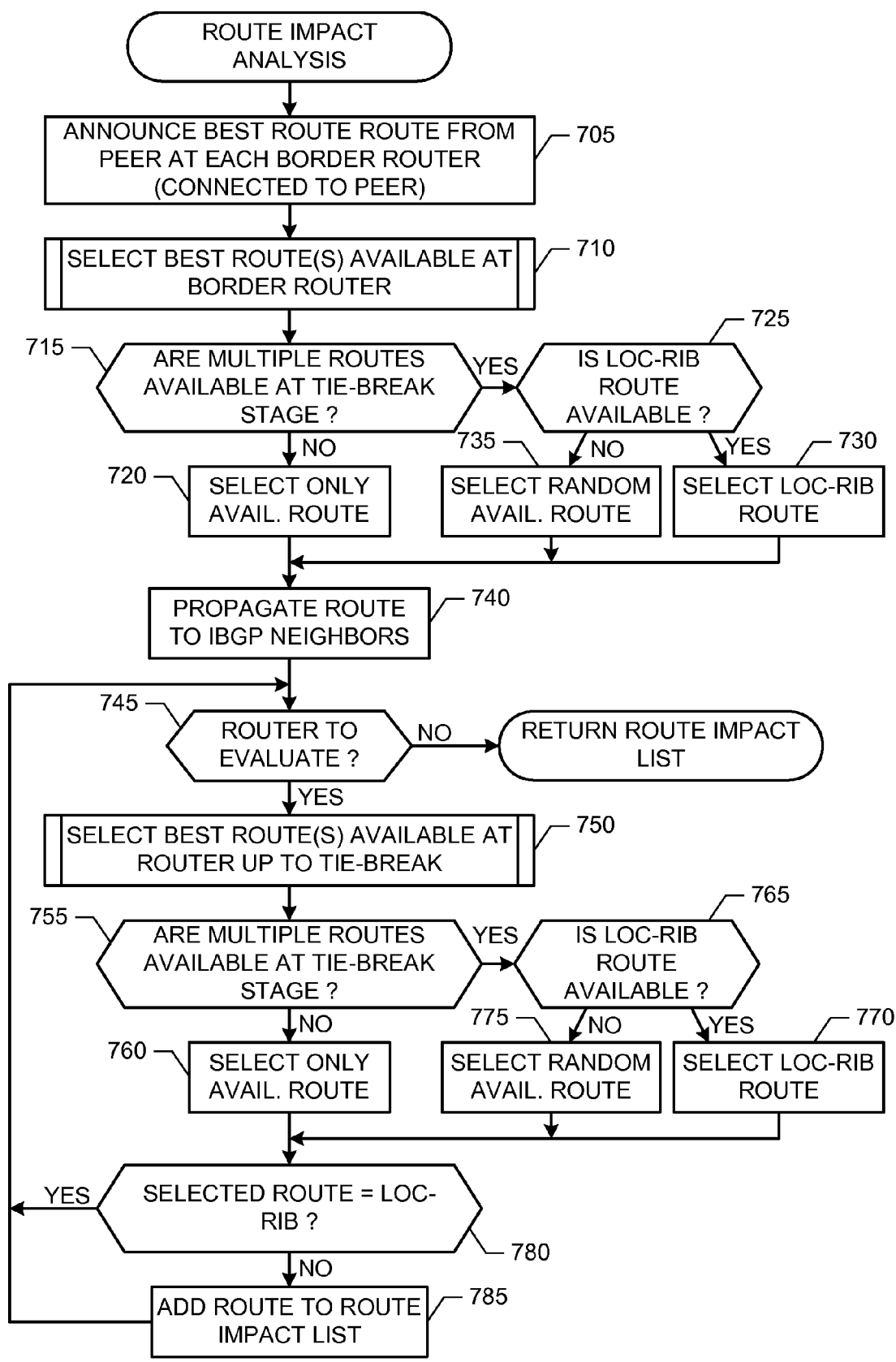

If the AS 110 does not ignore MED attributes (block 615) or the route for the prefix as the presently considered border router was inferior due to any other criteria (block 610), the route analyzer 315 analyzes the impact of the inferior route advertisement by, for example, carrying out the example process of FIG. 7 (block 620). Control then proceeds to block 625.

Moving to block 635, after all prefixes have been analyzed for each border router (block 630), the route analyzer 325 determines whether any inferior route advertisement resulted in a selection of a different route as compared to an assumption that the presently considered peer AS implemented a canonical routing policy (block 635). If there were no route selection impacts (block 635), control returns from the example process of FIG. 6 to, for example, the example process of FIG. 4 at block 425 with a return value of "No Impact."

Figure 9:
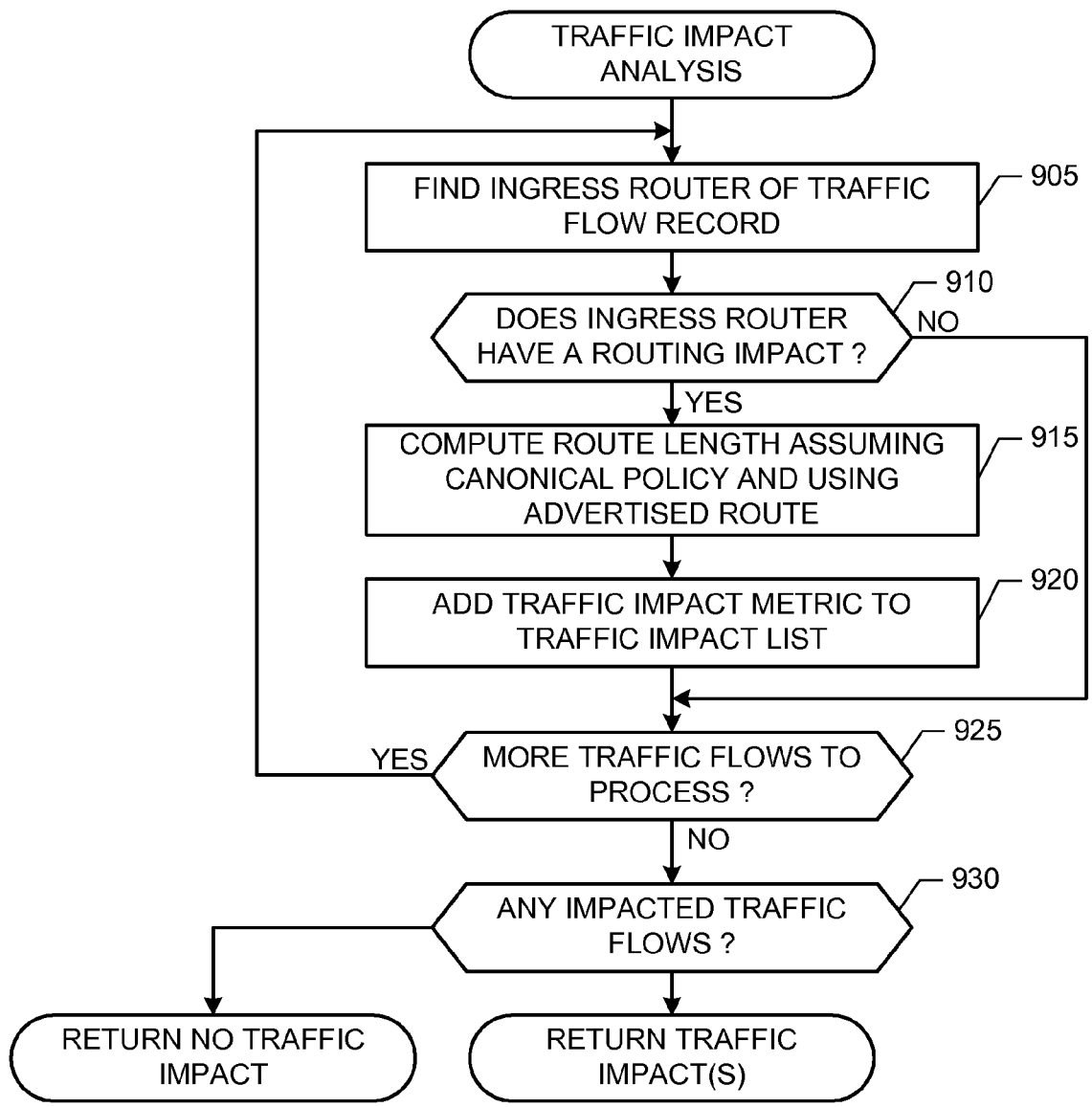
Figure 10:
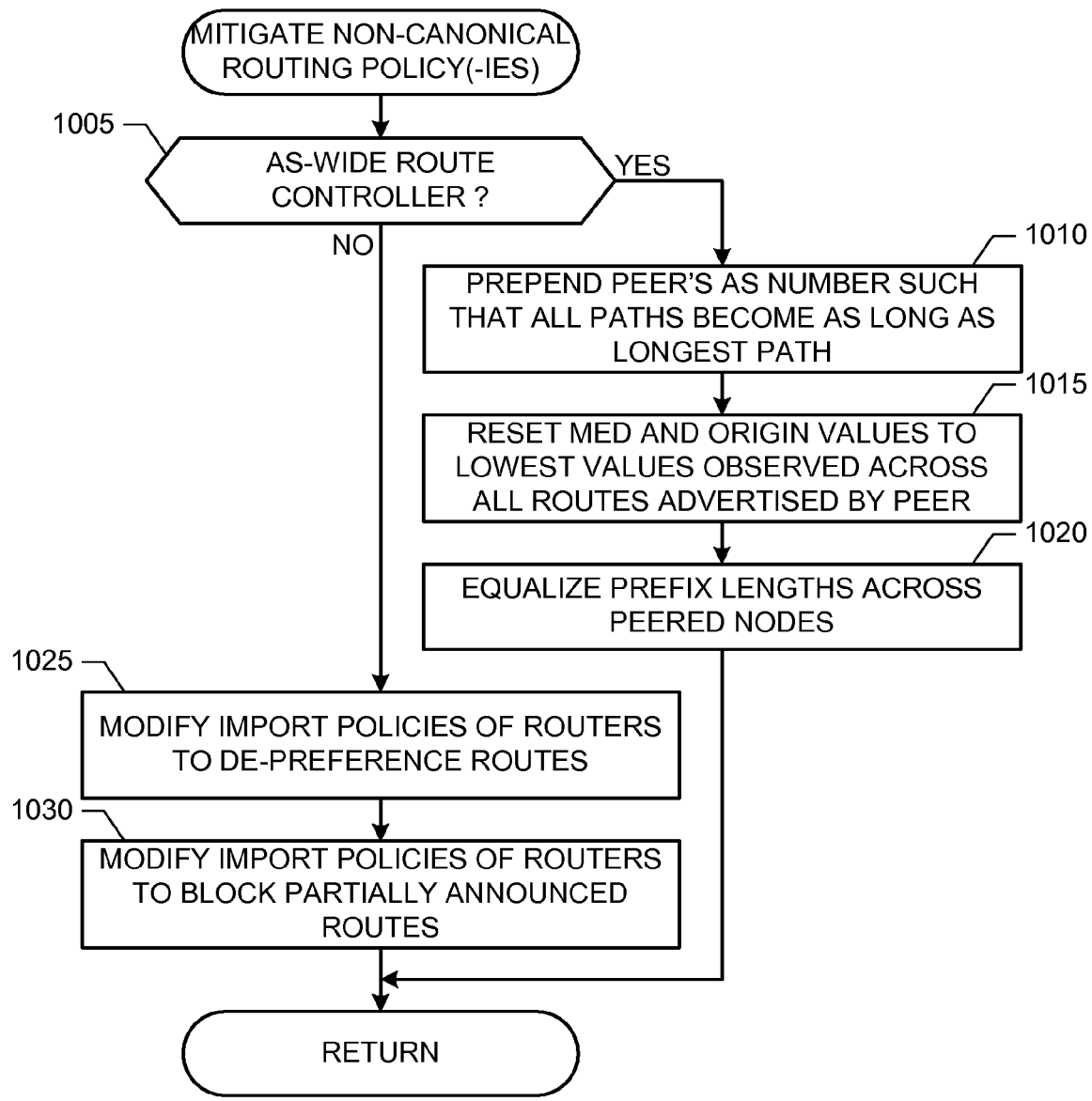

If there was at least one route selection impact (block 635), the traffic analyzer 320 of FIG. 3 computes, identifies, estimates and/or otherwise determines the traffic impact(s) of the non-canonical peering policy of the presently considered peer AS by, for example, carrying out the example process of FIG. 9 (block 640). If the route selection impact results in a traffic impact as compared to an assumption of a canonical routing policy (block 645), control returns from the example process of FIG. 6 to, for example, the example process of FIG. 4 at block 425 with a return value of "Route and Traffic Impact (s)." If the route selection impact does not result in a traffic impact as compared to an assumption of a canonical routing policy (block 645), control returns from the example process of FIG. 6 to, for example, the example process of FIG. 4 at block 425 with a return value of "Route Impact(s)."

The example process of FIG. 7 may be carried out to assess the impact of an inferior route that is advertised for a presently considered prefix at a presently considered border router. The example process of FIG. 7 begins with the example route analyzer 315 of FIG. 3 announce the best route advertised by the presently considered peer AS to any of the border routers to all of the border routers of the example AS 110 (block 705). The best route(s) for the prefix are then identified for the presently considered border router by, for example, carrying out the example process of FIG. 8 (block 710). If only one route is identified by the example process of FIG. 8 (block 715), the identified route is selected (block 720).

Figure 8:
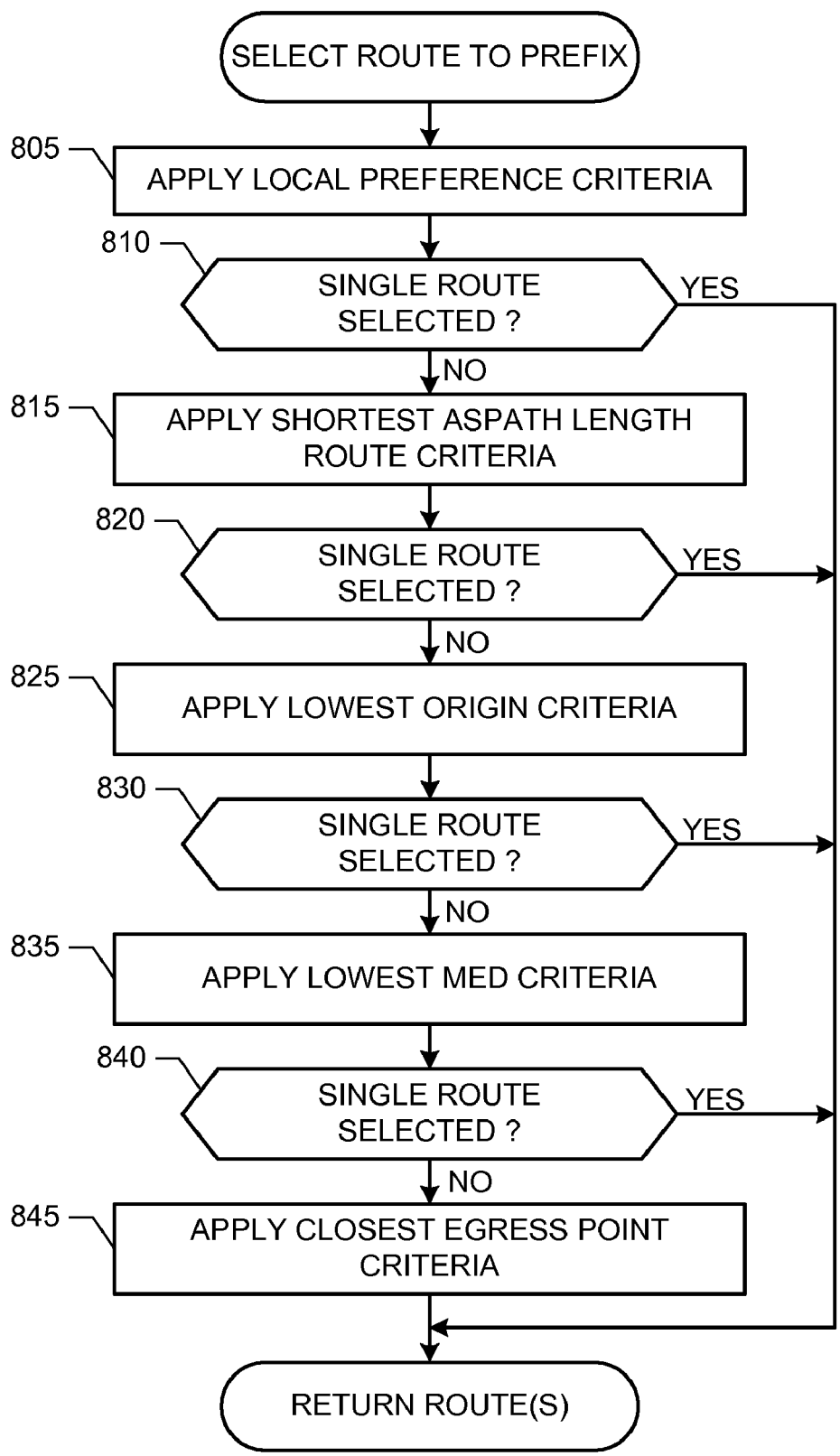

If there are more than one equally good route identified by the example process of FIG. 8 (block 715), and the route analyzer 315 determines that the Loc-RIB of the presently considered border router contains a route for the presently considered prefix (block 725), the route contained in the Loc-RIB is selected (block 730). If the Loc-RIB does not contain a route for the presently considered prefix (block 725), a random route from the identified routes is selected (block 735).

The route selected at block 720, 730 or 735 is propagated with the example AS 110 via the example route reflectors R1-R4 using iBGP (block 740). The example process continues by progressively evaluating the route selection(s) of other routers of the example AS 110. If there are no more routers to evaluate (block 745), control exits from the example process of FIG. 7 to, for example, the example process of FIG. 6 at block 625.

If there is another router to evaluate (block 745), the best route(s) for the prefix are then identified for the presently considered router by, for example, carrying out the example process of FIG. 8 (block 750). If only one route is identified by the example process of FIG. 8 (block 755), the identified route is selected (block 760).

If there are more than one equally good route identified by the example process of FIG. 8 (block 755) and the route analyzer 315 determines that the route stored in the Loc-RIB for the presently considered prefix is included in the list of equally good routes (block 765), the route contained in the Loc-RIB is selected (block 770). If the route stored in the Loc-RIB is not included in the list of equally good routes (block 765), a random route from the identified routes is selected (block 775).

The route selected at block 760, 770 or 775 is compared to the route for the presently considered prefix in the Loc-RIB of the presently considered router (block 780). If the selected route and the Loc-RIB route are the same (block 780), control returns to block 745 to evaluate additional routers of the example AS 110, if any. If the selected route and the Loc-RIB route are not the same (block 780), the route to the prefix and the presently considered router is added to a list of impacted routes (block 785). Control then proceeds to block 745 to evaluate additional routers of the example AS 110, if any.

The example process of FIG. 8 may carried out to select a route for a presently considered prefix at a presently considered router. The example process of FIG. 8 begins by applying any local preference criteria of the presently considered router (block 805). The example process determines whether the local preference criteria result in the identification of a single route (block 810). If a single route has been identified (block 810), the identified route is returned from the example process of FIG. 8 to, for example, the example process of FIG. 7 at block 715 or 750.

If a single route has not yet been identified (block 810), an ASPath length criterion is applied (block 815). If the application of the ASPath length criterion results in the identification of a single route (block 820), the identified route is returned from the example process of FIG. 8 to, for example, the example process of FIG. 7 at block 715 or 755.

If the ASpath length criterion did not result in the identification of a single route (block 820), a lowest Origin value criterion is applied (block 825). If the application of the Origin value criterion results in the identification of a single route (block 830), the identified route is returned from the example process of FIG. 8 to, for example, the example process of FIG. 7 at block 715 or 755.

If the Origin value criterion did not result in the identification of a single route (block 830), a lowest MED value criterion is applied (block 835). If the application of the MED value criterion results in the identification of a single route (block 840), the identified route is returned from the example process of FIG. 8 to, for example, the example process of FIG. 7 at block 715 or 755.

If the MED length criterion did not result in the identification of a single route (block 840), a closest egress point criterion is applied (block 845). The one or more routes that remain after the application of the closest egress point criterion (block 845) are returned from the example process of FIG. 8 to, for example, the example process of FIG. 7 at block 715 or 755.

The example process of FIG. 9 may be carried out to compute, estimate, analyze and/or otherwise determine the traffic impact due to a changed route selection caused by a non-canonical peering policy. Starting with a first traffic flow directed to a prefix advertised by the presently considered peer AS, the example traffic analyzer 320 of FIG. 3 finds the ingress border router A1-A5 via which the presently considered traffic flow ingressed into the AS 110 (block 905). The ingress border router of the traffic flow may be determined using any number and/or type(s) of algorithm(s), method(s) and/or rule(s). An example method to infer the ingress router for a traffic flow is described by Feldmann et al. in "Deriving Traffic Demands for Operational IP Networks: Methodology and Experience," which appeared in the Proceedings of ACM SIGCOMM 2000, and which is hereby incorporated by reference in its entirety.

The traffic analyzer determines whether the route selection at the ingress border router for the prefix was impacted by the non-canonical routing policy of the presently considered peer AS (block 910). If the route selection was not impacted (block 910), control proceeds to block 925 to determine if there are more traffic flows to analyze.

If the route selection was impacted (block 910), the traffic analyzer 320 computes the length of the route selected assuming a canonical routing policy and the length of the route selected based on the non-canonical routing policy (block 915). The example traffic analyzer 320 computes a difference between the route lengths and multiplies the route length difference by a number of bytes associated with the traffic flow to form a traffic impact metric that is, for example, expressed in units of byte-mile (block 920).

If there are more traffic flows to process (block 925), control returns to block 905 to process the next traffic flow. If there are no more traffic flows to process (block 925), the traffic analyzer 320 determines whether any traffic metrics were computed at block 920 (block 930). If there were no traffic impacts (block 930), control returns from the example process of FIG. 9 to, for example, the example process of FIG. 6 at block 645 with a return value of "No Traffic Impact." If there were traffic impacts (block 930), control returns from the example process of FIG. 9 to, for example, the example process of FIG. 6 at block 645 with a return value of "Traffic Impact(s)."

The example process of FIG. 10 may be carried out to mitigate the effect(s) of a non-canonical peering policy of a presently considered peer AS. The example process of FIG. 10 begins with the example mitigator 330 of FIG. 3 determining whether the example AS 110 implements an AS-wide route controller, which has complete visibility into all BGP routes advertised by the peer AS irrespective of whether these routes are chosen or not and that has the ability to select routes for every router of the example AS 110 from this full set of routes (block 1005). Example methods and apparatus to select routes for every router of the example AS 110 are described by Feamster et al. in "The Case for Separating Routing from Routers," which appeared in The Proceedings of the ACM SIGCOMM Workshop on Future Directions in Network Architecture (FDNA), August 2004, and which is hereby incorporated by reference in its entirety. If the AS 110 implements an AS-wide route controller (block 1005), the mitigator 330 prepends the peer AS's AS number such that all paths become as long as the longest path (block 1010), resets the MED and Origin values to the lowest values observed across all routes advertised by the peer AS (block 1015) and equalizes the prefix lengths across all border routers (block 1020). Control then exits from the example process of FIG. 10.

If the AS 110 does not implement an AS-wide route controller (block 1005), the mitigator 330 modifies the import policies 215 of the border routers A1-A3 to de-preference routes (block 1025) and to block partially announced routes (block 1030). Control then exits from the example process of FIG. 10.

Figure 14:
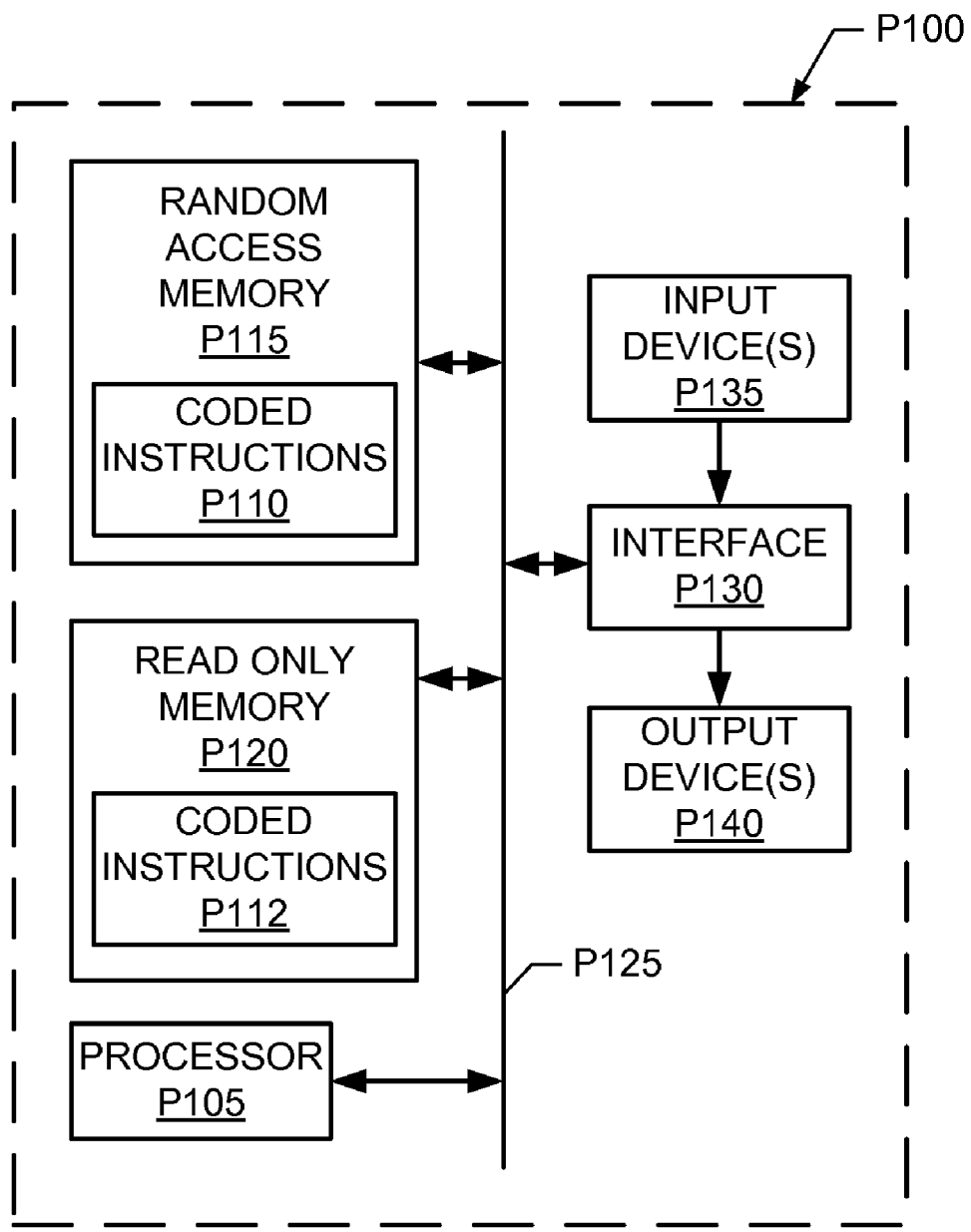
FIG. 14 is a schematic illustration of an example processor platform that may be used and/or programmed to carry out the example processes of FIGS. 4-10 and/or to implement any of all of the methods and apparatus disclosed herein.

FIG. 14 is a schematic diagram of an example processor platform P100 that may be used and/or programmed to implement the example peering policy analyzer 130 FIGS. 1 and 3. For example, the processor platform P100 can be implemented by one or more general-purpose processors, processor cores, microcontrollers, etc.

The processor platform P100 of the example of FIG. 14 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 4-10 to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to store the example routing policy analysis report 1300 of FIG. 13.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 and/or output devices P140 may be used to, for example, implement the network interface 305 of FIG. 3.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
    obtaining from first or second border routers of a first autonomous system (AS) first and second routing information advertised by respective third and fourth border routers of a second AS, the first routing information including a first route attribute for a first route within the second AS to a prefix associated with the second AS, the second routing information including a second route attribute for a second route within the second AS to the prefix, wherein the second AS is a peer of the first AS, the first and third border routers being communicatively coupled via a first AS-to-AS link, and the second and fourth border routers being communicatively coupled via a second AS-to-AS link;
    determining whether one of the first or second AS-to-AS links is advertised as an inferior AS-to-AS link by the second AS based on the advertised first and second route attributes; and
    when the one of the first and second AS-to-AS links is identified as inferior, determining whether a routing impact is present within the first AS due to the inferior AS-to-AS link.

2. A method as defined in claim 1, further comprising generating a routing policy impact report that includes a first value representative of the prefix, a second value representative of the advertised inferior AS-to-AS link, and an indicator representative of whether the routing impact is present within the first AS.

3. A method as defined in claim 1, further comprising determining a traffic impact within the first AS due to the identified inferior AS-to-AS link when the routing impact is present within the first AS.

4. A method as defined in claim 3, wherein determining the traffic impact comprises:
    identifying an ingress router associated with a traffic flow;
    determining whether the ingress router has a second routing impact due to the advertised inferior AS-to-AS link;
    when the ingress router experiences the second routing impact, computing a route length increase caused by the second routing impact; and
    computing a traffic impact metric based on the route length increase and a data rate associated with the traffic flow.

5. A method as defined in claim 1, further comprising modifying a configuration of one of the first or second border routers to mitigate the routing impact when the routing impact is present in the first AS.

6. A method as defined in claim 5, wherein modifying the configuration of the one of the first or second border routers comprises at least one of prepending an AS number associated with the second AS, modifying a multi-exit discriminator (MED) value, modifying an origin value, modifying a prefix length, or modifying an import policy.

7. A method as defined in claim 1, wherein determining whether the routing impact is present comprises:
    determining a best route advertised for the prefix by the second AS;
    announcing the advertised best route to one of the first or second border routers;
    selecting a route to the prefix at the one of the first or second border routers, wherein the routing impact is present when a propagation of the selected route within the first AS would cause a selection of a different route within the first AS.

8. A method as defined in claim 1, further comprising identifying a type of non-canonical peering policy associated with the second AS based on the first and second routing information.

9. A method as defined in claim 1, wherein obtaining the first and second routing information from the first and second border routers of the first AS comprises at least one of collecting routing information base (RIB) incoming route data from the first and second border routers, collecting RIB post-policy route data from the first and second border routers, or receiving updates from the first and second border routers.

10. A method as defined in claim 1, wherein the inferior AS-to-AS link represents the first route to the prefix advertised by the third border router that has at least one of an inferior ASPath value, an inferior Origin value or an inferior multi-exit discriminator (MED) value compared to the second route to the prefix advertised by the fourth border router.

11. A method as defined in claim 1, wherein the routing impact comprises a change in a selected route for the prefix resulting from the advertised inferior AS-to-AS link.

12. An apparatus comprising: a data collector to obtain from first and second border routers of a first autonomous system (AS) first and second border gateway protocol (BGP) routing information advertised by respective third and fourth border routers of a second AS, the first BGP routing information including a first route attribute for a first route within the second AS to a prefix associated with the second AS, the second BGP routing information including a second route attribute for a second route within the second AS to the prefix, wherein the second AS is a peer of the first AS, the first and third border routers being communicatively coupled via a first AS-to-AS link, and the second and fourth border routers being communicatively coupled via a second AS-to-AS link;
    a route classifier to identify one of the two or more AS-to-AS links as an inferior AS-to-AS link advertised by the second AS based on the first and second advertised route attributes; and
    a route analyzer to, when the one of the first or second AS-to-AS links is identified as inferior, determine whether a routing impact is present within the first AS due to the inferior AS-to-AS link, wherein at least one of the data collector, the route classifier or the route analyzer is implemented in hardware.

13. An apparatus as defined in claim 12, further comprising a report generator to generate a routing policy impact report that includes a first value representative of the prefix, a second value representative of the advertised inferior AS-to-AS link, and an indicator representative of whether the routing impact is present within the first AS.

14. An apparatus as defined in claim 12, further comprising a traffic analyzer to compute a traffic impact within the first AS due to the identified inferior AS-to-AS link when the routing impact is present within the first AS.

15. An apparatus as defined in claim 12, further comprising a mitigator to modify a configuration of one of the first or second border routers to mitigate the routing impact when the routing impact is present in the first AS.

16. An apparatus as defined in claim 15, wherein the mitigator is to at least one of prepend an AS number associated with the second AS, modify a multi-exit discriminator (MED) value, modify an origin value, modify a prefix length, or modify an import policy.

17. An apparatus as defined in claim 12, wherein the route analyzer is to determine whether the routing impact is present by:
    determining a best route advertised for the prefix by the second AS;
    announcing the advertised best route to one of the first or second border routers;
    selecting a route to the prefix at the one of the first or second border routers, wherein the routing impact is present when a propagation of the selected route within the first AS would cause a selection of a different route within the first AS.

18. An apparatus as defined in claim 12, wherein the data collector is to obtain the first and second BGP routing information from the first and second border routers of the first AS by at least one of collecting routing information base (RIB) incoming route data from the first and second border routers, collecting RIB post-policy route data from the first and second border routers, or receiving BGP updates from the first and second border routers.

19. A tangible article of manufacture excluding propagating signals and storing machine-accessible instructions that, when executed, cause a machine to:
    obtain from first and second border routers of a first autonomous system (AS) first and second border gateway protocol (BGP) routing information advertised by respective third and fourth border routers of a second AS, the first BGP routing information including a first route attribute for a first route within the second AS to a prefix associated with the second AS, the second BGP routing information including a second route attribute for a second route within the second AS to the prefix, wherein the second AS is a peer of the first AS, the first and third border routers being communicatively coupled via a first AS-to-AS link, and the second and fourth border routers being communicatively coupled via a second AS-to-AS link;
    identify one of the AS-to-AS links as an inferior AS-to-AS link advertised by the second AS based on the first and second advertised route attributes; and
    when the one of the first or second AS-to-AS links is identified as inferior, determine whether a routing impact is present within the first AS due to the advertised inferior AS-to-AS link.

20. An article of manufacture as defined in claim 19, wherein the machine-accessible instructions, when executed, cause the machine to generate a routing policy impact report that includes a first value representative of the prefix, a second value representative of the advertised inferior AS-to-AS link, and an indicator representative of whether the routing impact is present within the first AS.

21. An article of manufacture as defined in claim 19, wherein the machine-accessible instructions, when executed, cause the machine to determine a traffic impact within the first AS due to the identified inferior AS-to-AS link when the routing impact is present within the first AS.

22. An article of manufacture as defined in claim 21, wherein the machine-accessible instructions, when executed, cause the machine to determine the traffic impact by:
    identifying an ingress router associated with a traffic flow;
    determining whether the ingress router has a second routing impact due to the advertised inferior AS-to-AS link;
    when the ingress router experiences the second routing impact, computing a route length increase caused by the second routing impact; and
    computing a traffic impact metric based on the route length increase and a data rate associated with the traffic flow.

23. An article of manufacture as defined in claim 19, wherein the machine-accessible instructions, when executed, cause the machine to modify a configuration of one of the first or second border routers to mitigate the routing impact when the routing impact is present in the first AS.

24. An article of manufacture as defined in claim 19, wherein the machine-accessible instructions, when executed, cause the machine to determine whether the routing impact is present by:
    determining a best route advertised for the prefix by the second AS;

announcing the advertised best route to one of the first or second border routers;

selecting a route to the prefix at the one of the first or second border routers, wherein the routing impact is present when a propagation of the selected route within the first AS would cause a selection of a different route within the first AS.

25. An article of manufacture as defined in claim 19, wherein the machine-accessible instructions, when executed, cause the machine to identify a type of non-canonical peering policy associated with the second AS based on the first and second BGP routing information.

26. An article of manufacture as defined in claim 19, wherein the machine-accessible instructions, when executed, cause the machine to obtain the first and second BGP routing information from the first and second border routers of the first AS comprises at least one of collecting routing information base (RIB) incoming route data from the first and second border routers, collecting RIB post-policy route data from the first and second border routers, or receiving BGP updates from the first and second border routers.

* * * * *